US008018204B2

(12) United States Patent
Bourilkov et al.

(10) Patent No.: US 8,018,204 B2
(45) Date of Patent: Sep. 13, 2011

(54) COMPACT ULTRA FAST BATTERY CHARGER

(75) Inventors: Jordan T. Bourilkov, Stamford, CT (US); David N. Klein, Southbury, CT (US)

(73) Assignee: The Gillette Company, Boston, MA (US)

( * ) Notice: Subject to any disclaimer, the term of this patent is extended or adjusted under 35 U.S.C. 154(b) by 155 days.

(21) Appl. No.: 11/851,013

(22) Filed: Sep. 6, 2007

(65) Prior Publication Data

US 2008/0238363 A1  Oct. 2, 2008

Related U.S. Application Data

(60) Provisional application No. 60/908,013, filed on Mar. 26, 2007.

(51) Int. Cl.
*H02J 7/00* (2006.01)
*H02J 7/04* (2006.01)
*H02J 7/16* (2006.01)

(52) U.S. Cl. ........ 320/137; 320/132; 320/152; 320/157; 320/162

(58) Field of Classification Search .............. 320/152
See application file for complete search history.

(56) References Cited

U.S. PATENT DOCUMENTS

| 345,124 A | 7/1886 | Commelin et al. |
| 2005/0194934 A1 | 9/2005 | Iijima et al. |

OTHER PUBLICATIONS

Made-In-China.com, Lead-Acid Battery Charger, http://www.made-in-china.com/china-products/productviewatREyAncjJgK/Lead-Acid-Battery-Charger.html, 2008.
Bourilkov et al., U.S. Appl. No. 11/776,261, filed Nov. 7, 2007, entitled "Ultra Fast Battery Charger with Battery Sensing".
Omron Product Display, S8E3 Compact, Economical, 3-point Switching Power Supply, http://omrwsc.am.omron.com/webapp/wes/stores/servlet/ProductDisplay?catalogId=10001&storeId=10001&productId=34497&langId=-1&categoryId=16840, 2006.
David Linden, Handbook of Batteries. McGraw-Hill, 2nd Ed., pp. 1.9-23.12 (1995).
Falk & Salkind, "Alkaline Storage Batteries". John Wiley & Sons, Inc., pp. 1-41 (1969).
Global Sources, HCT Electric Co Ltd., Battery Charger, http://www.globalsources.com/gsol/I/Standard-battery/p/sm/102739242.htm, Undated.

*Primary Examiner* — Edward Tso
*Assistant Examiner* — Ahmed Omar
(74) *Attorney, Agent, or Firm* — Fish & Richardson P.C.

(57) ABSTRACT

Disclosed is a charger device. The charger device includes a housing, defining a volume, that includes a power conversion module to provide output power of between 3-300 W, and a controller configured to determine a current level to direct to one or more rechargeable batteries, and cause the output power to be directed to the one or more rechargeable batteries at a charging current substantially equal to the determined current level. A ratio of the output power directed to the one or more rechargeable batteries and the volume is equal to at least 10 W/in$^3$.

30 Claims, 4 Drawing Sheets

COMPACT ULTRA FAST BATTERY CHARGER

CROSS-REFERENCE TO RELATED APPLICATIONS

This application claims priority to U.S. Provisional Application Ser. No. 60/908,013, entitled "Lithium Iron Phosphate Ultra Fast Battery Charger" and filed on Mar. 26, 2007, the content of which is hereby incorporated by reference in its entirety.

BACKGROUND

Rechargeable batteries are typically charged by a source of constant voltage/constant current CV/CC) with crossover voltage, e.g., at 4.2V. Initially, the battery is charged using a constant current (i.e., in CC mode) until the crossover point is reached (e.g., 4.2V), at which point the charger switches to constant voltage mode to maintain the voltage at the terminal of the rechargeable battery at substantially about the crossover voltage. The charging period required to achieve 90-100% capacity is typically 2-4 h, with the CC stage being around 40 minutes at 1 C charging rate (i.e., a charging rate corresponding to a charging current level that would charge a battery in one hour). Generally, at the conclusion of the CC stage the rechargeable battery achieves a charge level of 60-70% of the charge capacity of the battery. The CV stage of the charging process generally takes 1-3 hours to complete. During that time the charging current level decreases and typically reaches a level corresponding to a charge rate of 0.1 C by the time the charging process is concluded.

SUMMARY

Conventional battery chargers typically have a volumetric output power density (defined as the ratio of the power outputted by the charger and the volume of the housing in which the charger's circuitry is disposed) of between 1 and 4 W/in$^3$. Such volumetric output power densities are affected by the volume occupied by the circuitry of the charger. One factor contributing to the overall volume of a charger is the incorporation within the charger of thermal monitoring elements (e.g., temperature sensors) and thermal control elements (e.g., heat sink components) to protect against overheating conditions. Another factor contributing to the overall volume occupied by a charger's circuitry is the incorporation of modules, such as a power factor corrector (PFC) module, to improve a charger's power efficiency.

In one aspect, a charger device is disclosed. The charger device includes a housing, defining a volume, that includes a power conversion module to provide output power of between 3-300 W, and a controller configured to determine a current level to direct to one or more rechargeable batteries, and cause the output power to be directed to the one or more rechargeable batteries at a charging current substantially equal to the determined current level. A ratio of the output power directed to the one or more rechargeable batteries and the volume is equal to at least 10 W/in$^3$.

Embodiments may include one or more of the following.

The charger device may be free of one or more of, for example, a power factor corrector module, an output capacitor and/or a second stage DC-DC voltage converter module.

The controller may be configured to determine the current level to direct to the one or more rechargeable batteries such that the one or more batteries achieve a predetermined charge within a charging period of time of 15 minutes or less. The pre-determined charge of the one or more batteries may be at least 80% of the charge capacity of the one or more rechargeable batteries, and the charging period of time may be approximately between 3-15 minutes. The pre-determined charge of the one or more rechargeable batteries may be approximately 80% of the charge capacity of the one or more batteries, and the charging period of time may be approximately between 3-4 minutes. The pre-determined charge of the one or more rechargeable batteries may be at least 90%-95% of the charge capacity of the one or more batteries, and the charging period of time may be approximately 5 minutes.

The controller may further be configured to cause the charging current to be terminated after a period of charging time substantially equal to a particular period of time has elapsed.

The power conversion module may include a voltage transformer. The device may further include a feedback control mechanism to cause the controller to regulate current outputted by the power conversion module. The feedback control mechanism may be configured to regulate the operation of the voltage transformer. The feedback control mechanism may be configured to maintain the voltage at respective terminals of the one or more rechargeable batteries at a pre-determined upper limit voltage after the voltage at the one or more rechargeable batteries reach the pre-determined upper-limit voltage level.

The controller configured to determine the current level may be configured to determine the current level to direct to one or more lithium-iron-phosphate-based rechargeable batteries.

The controller configured to cause the output power to be directed to the one or more rechargeable batteries may be configured to cause the output power to be directed to the one or more rechargeable batteries without monitoring temperatures of the one or more rechargeable batteries.

In another aspect, a method for charging one or more rechargeable batteries is disclosed. The method includes determining a current level to direct to the one or more rechargeable batteries, and directing output power of between 3-300 W to the one or more batteries at a charging current substantially equal to the determined current level, the output power being provided by a charger device having a housing defining a volume. A ratio of the output power and the volume is equal to at least 10 W/in$^3$.

Embodiments of the method may include any feature corresponding to any of the features as set forth above for the device. For example, the charger device may be free of one or more of, for example, a power factor corrector module, an output capacitor and/or a second stage DC-DC voltage converter module. The method may further include terminating the charging current after a period of charging time substantially equal to a particular period of time has elapsed.

The above aspects may include one or more of the following advantages. The compact charger is configured to provide output power, generally between 3-300 W, and have a volumetric output power density of at least 10 W/in$^3$. The charger is configured to operate intermittently and/or for short time durations (e.g., 5 minutes) and is implemented free of elements/modules that are often used with conventional chargers, thus enabling the charger to achieve its relatively high volumetric output power density. For example, the charger disclosed herein is implemented with smaller heat sink elements and/or without thermal monitoring and control modules. The charger can also be implemented without a power factor corrector module. Because the compact charger disclosed herein is configured to charge batteries that have internal capacitances that enable filtering of pulsating currents/ voltages outputted by the charger device, in some embodiments such a charger device can be implemented with relatively small capacitors (or even without one or more of those capacitors). In some embodiments, the charger described herein can charge a rechargeable battery in approximately 4-6 minutes to approximately 90-95% capacity.

The details of one or more embodiments of the invention are set forth in the accompanying drawings and the description below. Other features, objects, and advantages of the invention will be apparent from the description and drawings, and from the claims.

DETAILED DESCRIPTION

Electrochemical cells can be primary cells or secondary cells. Primary electrochemical cells are meant to be discharged, e.g., to exhaustion, only once, and then discarded. Primary cells are not intended to be recharged. Primary cells are described, for example, in David Linden, Handbook of Batteries (McGraw-Hill, 2d ed. 1995). On the other hand, secondary electrochemical cells, also referred to below as rechargeable cells or batteries, can be recharged many times, e.g., fifty times, a hundred times, and so forth. Secondary cells are described, e.g., in Falk & Salkind, "Alkaline Storage Batteries", John Wiley & Sons, Inc. 1969; and U.S. Pat. No. 345,124, all hereby incorporated by reference.

Figure 1:
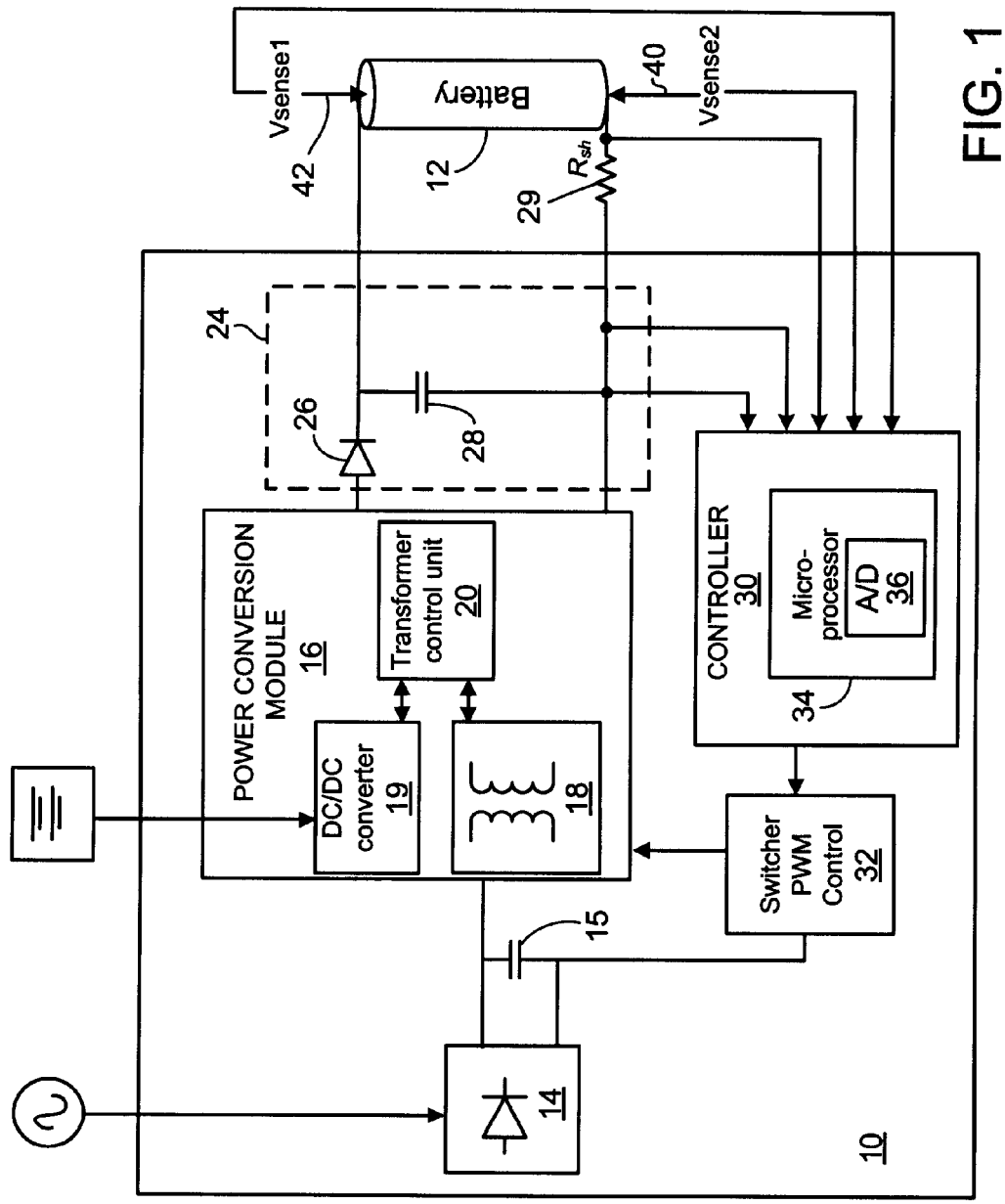
FIG. 1 is a block diagram of an exemplary embodiment of a charger.

Referring to FIG. 1, a charger 10 configured to charge a rechargeable battery 12 having at least one rechargeable electrochemical cell based on lithium-iron-phosphate chemistry is shown. Such a battery (which is sometimes referred to as a secondary battery) includes cells having, in some embodiments, lithium titanate anode material, and lithiated-iron-phosphate cathode materials adapted to enable fast recharge of rechargeable batteries based on such materials. Lithium-iron-phosphate chemistry has low internal resistance (R). Thermal dissipation resulting from the internal resistance of such batteries is proportional to $I^2R$ (where I is the charging current applied to the battery). Because of the low internal resistance of batteries based on lithium-iron-phosphate chemistry, such batteries can accept high charging currents.

Accordingly, using low internal resistance batteries, such as lithium-iron-phosphate batteries, the batteries can be charged to approximately 80% capacity in constant current (CC) mode in 3-4 minutes, and can be charged to approximately 90-95% capacity in approximately 5 minutes. As will become apparent below, the use of a large charging current to charge a battery based on lithium-iron-phosphate chemistry generally results in the battery achieving 90-95% charge capacity within five (5) minutes, and accordingly, the charger is configured to terminate the charging operation after that time period has elapsed without having to perform any checks to determine the charge or voltage level of the battery, or to perform thermal monitoring and/or thermal control operations. The charger may use a timer to measure to charge period and terminate the charging operation upon the timer reaching the pre-specified charge time period, e.g., 5 minutes. Although FIG. 1 shows a single battery 12 connected to the charger 10, the charger 10 may be configured to have additional batteries connected to it. Further, the charger 10 may be configured to receive and charge different battery types including cylindrical batteries, prismatic batteries, coin or button batteries, etc.

The charger 10 is configured to provide output power of, generally between 3-300 W, at a constant charging current to the battery 12 upon commencement of the charging operation. During the period in which a constant current is delivered to the battery (i.e., the charger operating in constant current, or CC mode), the voltage of the battery 12 increases. When the voltage of the battery reached a pre-determined upper limit voltage of, for example, 3.8V (this upper limit voltage is sometimes referred to as the crossover voltage), the charger is configured to maintain the battery's voltage at that upper limit voltage for the remainder of the charging period. During the period that a constant voltage substantially equal to the pre-determined crossover value is applied to the battery 12, the charger 10 is said to be operating in constant voltage, or CV, mode.

The charging operation terminates, in some embodiments, after a pre-determined period of time has elapsed, e.g. 5 minutes from the commencement of the charging operation. Because the charger is configured to unconditionally terminate the charging operation within a relatively short period of time, during which a significant rise in the temperature of the battery and/or of the charger 10 is unlikely, in some embodiments, it is not necessary to monitor the temperature of the battery 12 and/or the charger 10. Accordingly, in embodiments in which thermal monitoring and control operations are not performed, and thus elements and modules to implement those operations are not used or downsized, the charger 10 is more physically compact and the circuitry is simplified.

As farther shown in FIG. 1, in some embodiments, the charger 10 is implemented such that current/voltage regulation is performed directly on the charger's power conversion section (e.g., power conversion module 16 shown in FIG. 1) using, for example, a feedback control mechanism (such a configuration is referred to as primary-side voltage/current regulation.) In other words, the control mechanism regulates the switching frequency or pulse duration of the power conversion module 16, thus regulating the output voltage/current of the converter. Accordingly, in such embodiments, the charger 10 does not include multiple voltage conversion stages (e.g., an AC/DC conversion stage followed by, for example, a buck converter circuit), and as a result, the charger 10 can reduce power losses that are generally sustained in multi-stage power conversion circuit. For example, by implementing primary-side voltage/current control, power efficiency (e.g., the percentage of input power ultimately delivered to the output of the power conversion circuit) is typically in the range of 80-90%. In contrast, a two-stage power conversion circuit generally achieve 80-90% efficiency per stage, and thus the overall pgower efficiency for a two-stage power conversion circuit is generally in the range of 60-80%. These losses in power efficiency are manifested as heat dissipation in the power conversion stages.

The charger 10 may include a rectifier module 14 that is electrically coupled to an AC power source such as a source providing power at a rating of 85V-265V and 50 Hz-60 Hz. A capacitor 15 (sometimes referred to as a reservoir capacitor) to perform filtering operations (e.g., smoothing ripples) may be coupled to the rectifier. Because rechargeable batteries have an internal capacitance, the batteries themselves facilitate some of the filtering operations that is to be performed. Accordingly, in some embodiments, the size of the capacitor 15 (and/or capacitor 28) can be reduced because the battery 12 will have sufficient capacitances to perform, together with the capacitor 15, the filtering operations.

Coupled to the rectifier module 14 is the power conversion module 16 that includes a transformer 18 and a transformer control unit 20 to facilitate regulating the operation of the transformer 18. In some embodiments, the power conversion module 16 is implemented as a switcher converter in which the desired voltage level at the output of the power conversion module 16 is achieved by switching the power conversion module 16 on and off. During the switcher's on-period, a voltage is provided at the output of the power conversion module 16, and during the off-period, no voltage is provided at output terminals of the power conversion module 16. Such a switcher converter may be implemented, in some embodiments, using discrete transistors (e.g., MOSFET transistors), or using a suitable integrated circuit (IC) to perform the switching operation.

The use of the rectifier module 14 coupled to the power conversion module 16 causes AC power provided at the input to the charger 10 to be converted to a low D.C. voltage suitable for charging rechargeable batteries (e.g., DC voltages at levels of approximately between 3.7-4.2V.)

In some embodiments, an additional DC-DC converter 19 is incorporated into the power conversion module 16 to convert an external DC power source, such as a car's DC power supply, to a DC power level suitable for charging rechargeable batteries. For example, in some embodiments, a car's DC power supply supplies DC power at approximately 11V to 14.4V, and the DC-DC converter 19 converts that voltage level to a suitable voltage level. The added DC-DC converter can be configured to accept a DC power source in the range of 1.2V to approximately 24V. Thus, in some embodiments the DC-DC converter is an up-converter, increasing the voltage of, e.g., 1.2V to a DC charging voltage of, e.g., 3.7 to 4.2 volts, whereas in those embodiments in which the external DC power source has a voltage exceeding 4.2 V, the converter is a down converter.

Electrically coupled to the output of the power conversion module 16 is a rectifier/filter circuit 24 that includes a diode 26 connected in series to a capacitor 28, in parallel to the battery output. In some embodiments, a MOSFET-based synchronous rectification circuit may be used in place of the diode 26. The rectifier/filter circuit 24 is configured to reduce current/voltage ripples at the output of the power conversion module 16 and dissipate the heat of 26. The filter circuit 24 is also configured to discharge energy stored in the capacitor 28 into the battery 12 during off-periods when no current is provided at the output of the power conversion module 16. Thus, current provided by the power conversion module 16 during its on-periods and the current provided by the capacitor 28 during the off-periods of the power conversion module 16 results in an effective current substantially equal to a desired average charging current to be applied to the battery 12. The diode 26 is connected so that current discharged by the capacitor 28 is directed to the battery 12 and not into the power conversion module 16.

As further shown, a shunt resistor 29 (denoted as $R_{sh}$) is coupled to one of the terminals of the battery 12. Because the voltage drop across the shunt resistor is proportional to the battery charging current. Thus, the shunt resistor 29 serves as a current sensor to measure the level of the current applied to the battery 12. The measured level of the current at the shunt resistor 29 can thus be provided to the charger's feedback mechanism to facilitate controlling the charging current (e.g., maintain the charging current at substantially a constant level when the charger 10 operates in CC mode).

To control the power directed to the battery 12, a feedback mechanism that includes a controller 30 is used to regulate the DC output voltage of the power conversion module 16. The controller 30 is electrically coupled to a switcher Pulse Width Modulation (PWM) control unit 32 that receives control signals from the controller 30, and generates, in response, pulse width modulated signals that are provided to the transformer control unit 20 to cause the power conversion module 16 to provide power at its output. When the pulse width modulated signals are withdrawn, the transformer control unit 20 causes the voltage to be withdrawn from the output of the power conversion module 16. Thus, using the feedback mechanism, the current applied to the battery 12 can be regulated so that, for example, current substantially equal to the charging current is applied to the battery 12.

The controller 30 is further configured to cause the charging current to be terminated after a specified or predetermined time period (e.g., 5 minutes) has elapsed.

In some embodiments, determination of the charging current may be performed by identifying the capacity of the battery(s) connected to the charger 10 using, for example, an identification mechanism that provides data representative of the battery capacity and/or battery type. A detailed description of an exemplary charger device that includes an identification mechanism based on the use of an ID resistor having a resistance representative of the battery's capacity is provided in U.S. patent application Ser. No. 11/776,261, entitled "Ultra Fast Battery Charger with Battery Sensing", filed Jul. 11, 2007, the content of which is hereby incorporated by reference in its entirety.

Determination of the charging current to be applied to the battery 12 may also be based, at least in part, on user specified input provided through a user interface (not shown) disposed on the compact charger 10. Such a user interface may include, for example, switches, buttons and/or knobs through which a user may indicate, for example, the capacity of the battery that is to be recharged. Additionally, in some embodiments the interface may be configured to enable the user to specify other parameters germane to the charging process, such as, for example, the charging period (in circumstances where a longer charging period, e.g., 10-15 minutes, is desired.) To determine the specific charging current to use, a lookup table that indexes suitable charging currents corresponding to the user-specified parameters is accessed. For example, if the user specifies that a 500 mAh capacity lithium-iron-phosphate battery is to be recharged, the entry in the look-up table corresponding to this specified capacity would be retrieved. In some embodiments, computation techniques may be used to determine the appropriate charging current.

The user interface may also include an input element (e.g., switch) to enable or disable the charger 10. The user interface may also include output indicator devices (not shown) such as LED's to provide status information to a user regarding the charger and/or battery 12 connected thereto, a display device configured to provide output information to the user, etc. For example, the user interface may include a LED that is illuminated when the charger switches from constant current mode to constant voltage mode. Generally, when the battery's voltage reaches the cross-over point (e.g., between 3.8-4.2V), the battery's charge is typically 80-90% of the battery's charge capacity, and thus is substantially ready for use. The illuminated LED indicates to the user that the charge on the battery is at least, at a value in the range of e.g. 80-90% of full charge, giving the user the option of removing the battery prior to the completion of charging operation if the user requires the battery for some immediate use and does not want to wait for the charging operation to be fully completed.

In some embodiments, the user interface may further include, for example, additional output devices to provide additional information. For example, the user interface may include a red LED that is illuminated if a fault condition, such as an over-voltage, and may include another LED, e.g., a yellow or green LED device, to indicate that the charging operation of the battery 12 is in progress.

As further shown in FIG. 1, the controller 30 includes a processor device 34 configured to control the charging operations performed on the battery 12. The processor device 26 may be any type of computing and/or processing device, such as a PIC18F1320 microcontroller from Microchip Technology Inc. The processor device 34 used in the implementation of the controller 30 includes volatile and/or non-volatile memory elements configured to store software containing computer instructions to enable general operations of the processor-based device, as well as implementation programs to perform charging operations on the battery 12 connected to the charger, including such charging operations that achieve at least 90% charge capacity in approximately 5 minutes.

The processor 34 includes an analog-to-digital (A/D) converter 36 with multiple analog and digital input and output lines. The A/D converter 36 is configured to receive signals from sensors (described below) coupled to the battery to facilitate regulating and controlling the charging operation. In some embodiments, the controller 30 may also include a digital signal processor (DSP) to perform some or all of the processing functions of the control device, as described herein.

In some embodiments, the controller 30 may include an analog controller implementation. In such embodiments, probes from the analog controller are coupled to the terminals of the shunt resistor 29. The probes provide the controller with information regarding the current and/or voltage levels at the shunt resistor 29, based upon which the charging current applied to the battery 29 can be controlled.

The charger's various modules, including the rectifier unit 14, the transformer control unit 20, the processor 34, and the switcher PWM control unit 32 may be arranged on a circuit board (not shown) of the charger 10.

In some embodiments, the charger 10 determines a charging current to be applied to the rechargeable battery 12 such that the battery 12 is charged to, e.g., approximately 80%-95% charge capacity of the battery 12 in approximately 4-6 minutes. As explained herein, batteries based on lithium-iron-phosphate electrochemical cells have relatively low internal resistance and thus can be charged with relatively large charging currents in the order of, for example, 10 C to 15 C (1 C corresponds to a current that would be required to charge a particular rechargeable battery in 1 hour, and thus a charging rate of 15 C corresponds to the current that would be required to charge the rechargeable battery in 4 minutes and a charging rate of 10 C corresponds to a current that would be required to charge a rechargeable battery in 6 minutes). Because of the low charging resistance of lithium-iron-phosphate batteries, significant heat dissipation is avoided and accordingly such batteries can withstand high charging currents without the battery's performance or durability being adversely affected.

To cause the output power at a charging current substantially equal to the determined average current to be directed to the battery 12, the on-period, or duty cycle, for the power conversion module 16 is adjusted until the charging current applied to the battery 12 (determined based on the current/voltage measured at the shunt resistor 29) reaches a level substantially equal to the value of the determined current. Specifically, in some embodiments, controller 30 periodically receives (e.g., every 0.1 second) a measurement of the current flowing through the battery 12 as measured, for example, at the shunt resistor 29. Based on this received measured current, adjustments to the duty cycle are made to adjust the current flowing through the battery 12 so that that current converges to a value substantially equal to the charging current level.

The charger 10 may also include battery voltage sensors (e.g., sensors 40 and 42) that are electrically coupled to the charging terminals of the charger 10. The voltage sensor periodically measures (e.g., every 0.1 seconds) the voltage at the terminals of the battery 12, particularly during the constant voltage stage of the charging process. These periodical voltage measurements enable controlling the voltage provided by the power conversion module 16 during the constant voltage (CV) stage so that the voltage applied at the terminals of the battery 12 during the CV stage is at a substantially constant level (e.g., the pre-determined upper-limit voltage.)

The current/voltage measured by the sensors 29, 40 and 42 may also be used to determine if fault conditions exist that require termination of charging operation, or that the charging operation not be commenced. For example, the controller 30 determines if the voltage measured by the voltage sensors 40 and 42 at the terminals of the battery 12 is within a predetermined range of voltage levels for the battery 12 (e.g., 2 to 3.8V). If the measured value is below the lower voltage limit of the range, this may be indicative that the battery is defective. If the measured value is above the upper limit of the range, this could be indicative that the battery is already fully charged and thus further charging is not required and might damage the battery. Accordingly, if the measured voltage does not fall within the predetermined range, a fault condition is deemed to exist.

The charger may make a similar determination with respect to the current measured via the shunt resistor 29, and if the measured current is outside a predetermined current range, a fault condition may be deemed to exist, and consequently the charging operation would either not be commenced, or would be terminated.

In some embodiments, the received measured signals are processed using analog logic processing elements (not shown) such as dedicated charge controller devices that may include, for example, threshold comparators, to determine the level of the voltage and current level measured by the sensors 29 and/or 40 and 42. The charger 10 may also include a signal conditioning block (not shown) for performing signal filtering and processing on analog and/or digital input signals to prevent incorrect measurements (e.g., incorrect measurements of voltage, current, etc.) that may be caused by extraneous factors such as circuit level noise.

In some embodiments, the controller 30 is configured to monitor the voltage increase rate by periodically measuring the voltage at the terminals of the battery 12, and adjust the charging current applied to the battery 12 such that the pre-determined upper voltage limit is reached within some specified voltage rise period of time. Based on the measured voltage increase rate, the charging current level is adjusted to increase or decrease the charging current such that the pre-determined upper voltage limit is reached within the specified voltage rise period. Adjustment of the charging current level is performed, for example, in accordance with a predictor-corrector technique that uses a Kalman filter. Other approaches for determining adjustments to the current to achieve the pre-determined upper voltage limit may be used.

As noted, because the charger described herein charges batteries, e.g. lithium-iron-phosphate batteries, over a relatively short interval (e.g., 5 minutes), such a charger typically would not generate significant heat during that period of operation. Therefore, certain modules and/or components configured to safeguard the operation of conventional chargers to prevent damage and unsafe operation due to the generation of heat may be eliminated from the charger. For example, the charger 10 may be constructed without employing thermal control elements (e.g., fans, heat sink elements, other types of control modules, etc.) and/or without thermal monitoring elements (e.g., thermal sensors such as thermistors).

In some embodiments, the charger device 10 can be implemented with reduced size heat sink elements to dissipate heat generated by, for example, the Switcher PWM control unit 32 and/or the diode 26. Because the charger 10 operates intermittently for short periods of time, it would be safe to operate the charger 10 with reduced-size heat sink elements (or without heat sink) for the Switcher PWM control unit, the diode 26 and/or any other heat-generating component used in the implementation of the charger 10.

Further, by not using heat sink elements, or alternatively, by reducing the physical dimensions of heat sink elements (frequently, heat sink elements, and other types of components, are configured to have large surface areas to dissipate generated heat), the size requirements for the charger device 10 are reduced, thus reducing the overall dimensions (e.g., the volume) of the charger's housing.

A further implementation that can be used to reduce the size of the charger 10 is to use a MOSFET-based rectifier instead of the diode 26. A synchronous MOSFET-based rectifier does not generate significant levels of heat in comparison to diode or bi-polar transistor implementations. Thus, when using a MOSFET-based rectifier, reduced-size heat sink elements (and thus a reduced-size charger) may be used.

Another implementation that enables reducing the size (e.g., volume) of the charger 10 is to reduce the size of the capacitors (e.g., the capacitors 15 and/or 28) used to perform filtering operations on the input and/or output currents/voltages of the charger 10. Particularly, as described above, batteries, including rechargeable lithium-iron-phosphate batteries, have an inherent internal capacitance sufficiently high to enable those batteries to smooth the current/voltage ripples applied to them, thus enabling the batteries to avoid unsafe operating conditions (e.g., conditions such as lithium plating of the anode electrodes of the batteries). Thus, the batteries' internal capacitances enable the batteries to perform some of the filtering operations that otherwise would have to be performed by dedicated filtering circuits of conventional power supplies and/or power conversion modules. Accordingly, in one implementation of the charger device 10, the capacitance value of the output capacitor 28 is reduced, or alternatively, the capacitor 28 is removed from the implementation of the charger device 10. By reducing the value of, or eliminating, the capacitor 28, a corresponding reduction in the volume of the charger's housing may be achieved.

Similarly, in some embodiments, the capacitance value of the reservoir capacitor 15 coupled to the rectifier 14 may be reduced.

Another arrangement that reduces the overall physical dimensions of the charger (and thus the physical dimension, including the volume, of the housing encompassing the charger device circuitry) is one in which a power factor corrector (PFC) module is not included with the charger 10. A PFC module, which is sometimes used with conventional chargers, is configured to eliminate power harmonics of AC currents/voltage and is generally implemented using filters that include capacitors, inductors and/or additional switchers. Conventional power supplies and/or power conversion modules sometime incorporate a PFC module into their implementation to improve power efficiency.

However, because the charger 10 operates intermittently and/or for short time durations, overall power efficiencies that may be achieved through use of a PFC module with the charger 10 are generally small. Accordingly, in some embodiments, the charger device 10 is implemented without a PFC module. By not including a PFC module (which includes filter elements such as capacitors, resistors, and active components) the overall size requirements for the charger device can be reduced.

Thus, in some embodiments, the charger device 10 is implemented so that it free of one or more of, for example, heat sink elements, an output capacitor such as the capacitor 28, and/or a PFC module. Furthermore, in some embodiments, the charger 10 is implemented with a reduced reservoir capacitor such as the capacitor 15.

An exemplary implementation of a compact charger device that is free of one or more of heat sink elements, an output capacitor, a reservoir capacitor and/or a PFC module can be configured to output approximately 50 W of power (3.6-5V/ 10-12.5A) to charge lithium-iron-phosphate batteries each having nominal voltages of 3.3V and a capacity of 1 Ah. (Alternatively, in some implementations, reservoir capacitors and output capacitors of the charger 10 have a smaller capacitance, and thus size, as compared to capacitors that are ordinarily used with a charger device of comparable performance capabilities, e.g., approximately 50 W of output power). For a compact charger device configured to output 50 W of power, the charger device can be housed in a volume of less than 5 cubic inches (5 in$^3$). Thus, the volumetric output power density, defined as the ratio of the output power of a particular charger device and the volume of the housing holding the circuitry of the particular charger device, for the exemplary compact charger device 10 is approximately 50 W/5 in$^3$=10 W/in$^3$.

As shown in the table below, similar volumetric output power densities for chargers of varying performance capabilities (e.g., chargers whose output power ranges between 3-300 W) may be obtained.

| Output Current [A] | Output Power [W] | Charger Volume less than [in$^3$] |
|---|---|---|
| 2 | 8 | 0.8 |
| 4 | 16 | 1.6 |
| 6 | 24 | 2.4 |
| 8 | 32 | 3.2 |
| 10 | 40 | 4.0 |
| 12 | 48 | 4.8 |
| 14 | 56 | 5.6 |
| 16 | 64 | 6.4 |
| 18 | 72 | 7.2 |
| 20 | 80 | 8.0 |
| 22 | 88 | 8.8 |
| 24 | 96 | 9.6 |

Thus, the volumetric power output densities that can be achieved for these various charger devices is at least 10 W/in$^3$.

Figure 2:
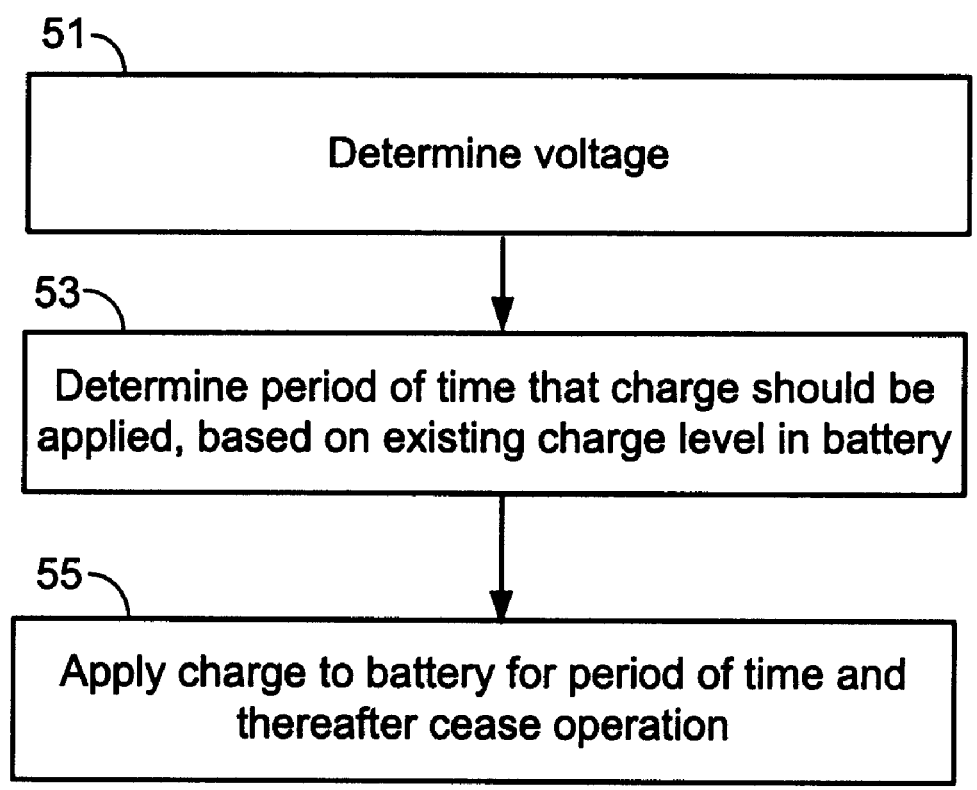
FIG. 2 is a flow chart depicting an embodiment with variable timing.

Referring now to FIG. 2, in some embodiments, the controller 30 may be configured to determine 51 the approximate existing charge level of the battery 12 (e.g., by measuring the voltage of battery), and based on the determined approximate existing charge level, determine 53 a period of time during which a charging current should be applied to the battery 12. The determined charge level is applied to the battery for the determined period of time and thereafter the charger will cease operation. This embodiment provides a flexible timer that self-adjusts charging time according to the existing battery charge. Thus, depending on the initial state of charge of the battery, the charging operation can occur over a period of a minute or less, if the battery was nearly fully charged, up to, e.g., about 5 or 6 minutes if the battery was substantially discharged.

Figure 3:
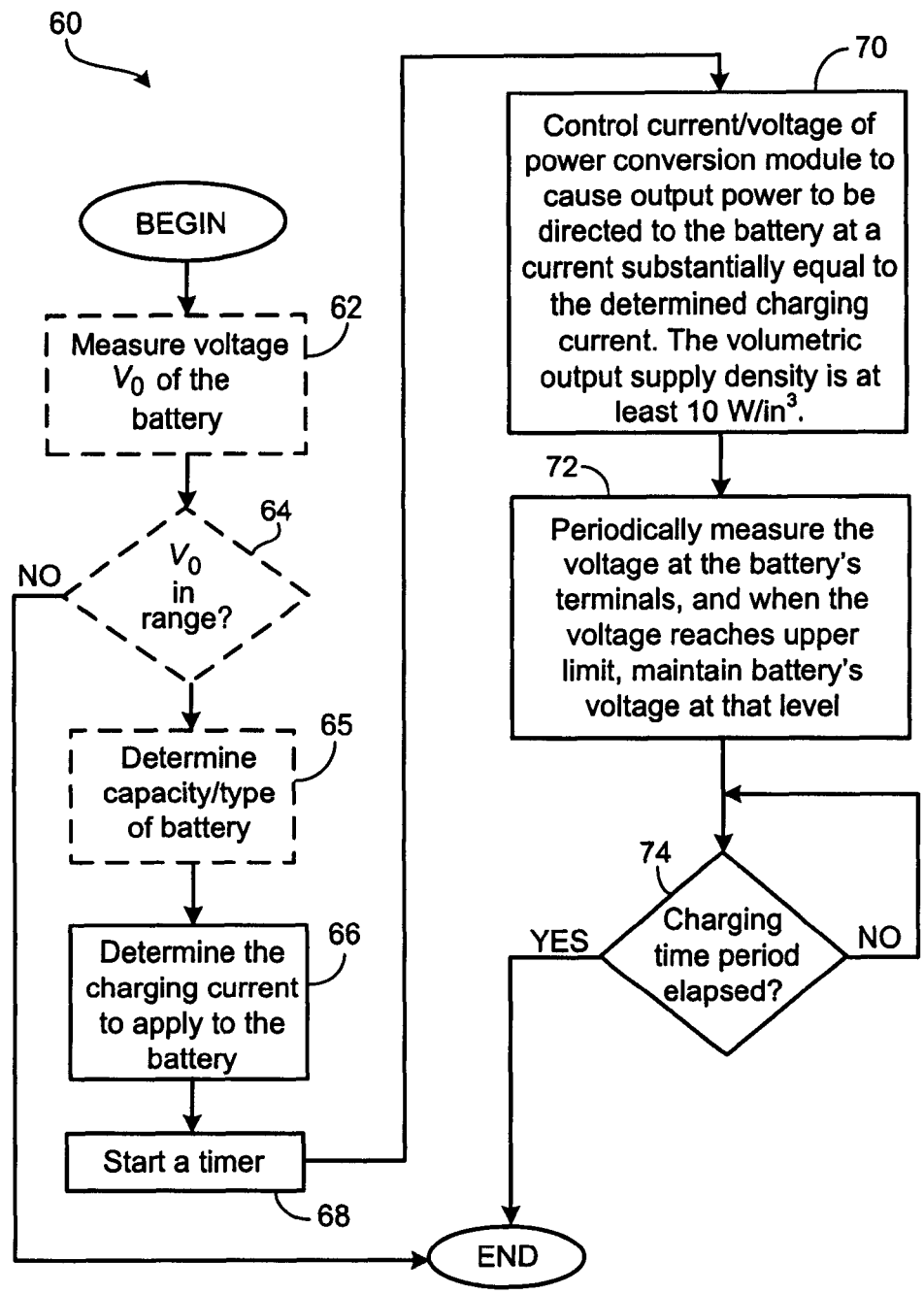
FIG. 3 is a flow chart of an exemplary embodiment of a charging procedure performed by the charger of FIG. 1.

Referring to FIG. 3, an exemplary embodiment of a charging procedure 60 to recharge the rechargeable battery 12. The battery 12 may be received in a charging compartment of the charger 10, or in some embodiments, the charger 10 may be electrically coupled to the battery 12 that is housed within a battery-operable device (e.g., a cell-phone). Initially, the charger 10 may optionally determine, prior to commencing the charging operations, whether certain fault conditions exist. Thus, for example, the charger 10 measures 62 the voltage of the battery 12. The charger 10 determines 64 whether the measured voltage $V_O$ is within a predetermined range (e.g., that $V_O$ is between 2-3.8V.) In circumstances in which it is determined that the measured voltage is not within the predetermined acceptable ranges thus rendering a charging operation under existing conditions to be unsafe, the charger does not proceed with the charging operation, and the procedure 60 may terminate.

The charger 10 determines 66 a charging current to be applied to the battery 12. In some embodiments, the determined charging current is such that the battery 12 achieves at least a 90% charge capacity in approximately 4-6 minutes.

If the charger 10 is adapted to receive different types of batteries of different capacities, then the charger 10 may determine 65 the capacity and/or type of the battery 12 inserted into the charging compartment of the charger 10. In some embodiments, the charger 10 includes an identification mechanism configured to measure the resistance of an ID resistor connected to the battery 12 that is representative of the capacity and/or type of the battery 12. Additionally and/or alternatively, the capacity and/or type of the battery 12 may be communicated to the charger via a user interface disposed, for example, on the body of the charger 10. The data communicated via the identification mechanism, user interface, or otherwise, is thus representative of the battery's capacity and/or type. The charger can thus determine the appropriate charging current to apply to the battery based on this data. For example, in circumstances where the charger 10 computes the resistance of an ID resistor of the battery 12, the charger 10 may access a lookup table stored on a memory storage module of the charger 10 that indexes suitable charging currents corresponding to the capacity associated with the computed resistance.

Having determined the charging current to be applied to battery 12, a timer, configured to measure the pre-specified time period of the charging operation, is started 68. The timer may be, for example, a dedicated timer module of the processor 34, or it may be a counter that is incremented at regular time intervals measured by an internal or external clock of the processor 34.

The current/voltage applied by the power conversion module 16 is controlled 70 to cause an output power, generally between 3-300 W, to be directed to the rechargeable battery 12 at a constant current substantially equal to the determined charging current. The charger 10 outputs power such that the volumetric output power density is at least 10 W/in³.

As explained, the charger 10 implements a primary-side feedback mechanism that includes the controller 30 and the switcher PWM control unit 32, that operates to adjust the current/voltage at the output of the power conversion module 16. During the off-time of the power conversion module 16 (i.e., when current/voltage at the output of the module 16 is withheld), the energy stored in the capacitor 28 is discharged to the battery 12 as a current. The combined current applied from the power conversion module 16, and the current discharged from the capacitor 28 result in an effective current substantially equal to the determined charging current.

The battery 12 is charged with substantially a constant current until the voltage at the battery's terminals reaches a pre-determined upper voltage limit. Thus, the voltage applied to the battery 12 is periodically measured 72 to determine when the pre-determined upper voltage limit (i.e., the crossover voltage) has been reached. When the voltage at the terminals of the battery 12 has reached the predetermined upper voltage limit, e.g., 4.2V, the power conversion module 16 is controlled (also at 72) to have a constant voltage level substantially equal to the crossover voltage level maintained at the terminals of the battery 12.

Optionally, a LED on the user interface of the charger 10 may illuminate to indicate that the crossover voltage point has been reached, and that therefore the battery has sufficient charge to properly operate. At that point a user may remove the battery 12 if the user desires to immediately use the battery.

The voltage increase rate may be periodically measured (operation not shown in FIG. 3) to cause the pre-determined upper voltage limit to be reached within the specified voltage rise period of time. Based on the measured voltage increase rate, the charging current level is adjusted (with a corresponding adjustment of the actuating signal applied to the current/voltage regulating circuit) to increase or decrease the charging current such that the predetermined upper voltage limit is reached within the specified voltage rise period.

After a period of time substantially equal to the charging time period has elapsed, as determined 74, the charging current applied to the battery 12 is terminated (for example, by ceasing electrical actuation power conversion module 16 using the switcher PWM control module 32 and/or the transformer control unit 20). The charging procedure is terminated at the expiration of a particular period of time after the pre-determined upper voltage limit of the battery 12 has been reached, or after some specified charge level of the battery 12 has been reached.

Figure 4A:
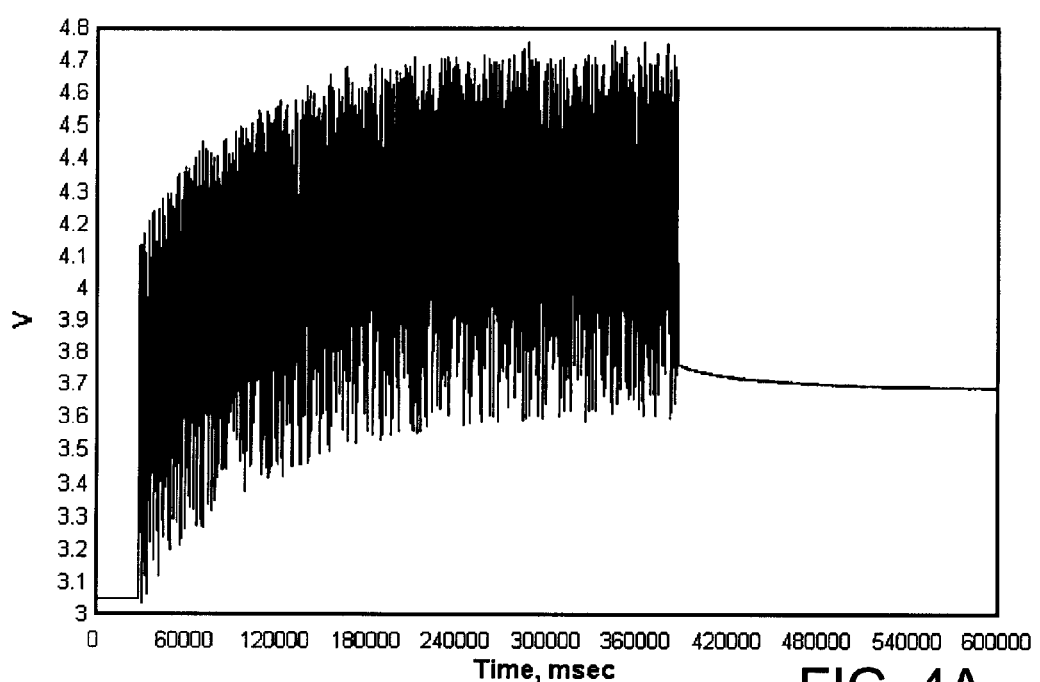
FIGS. 4A-B are graphs showing the charging voltage and charging current behaviors for a 1 Ah lithium-ion battery using the charger of FIG. 1.
Figure 4B:
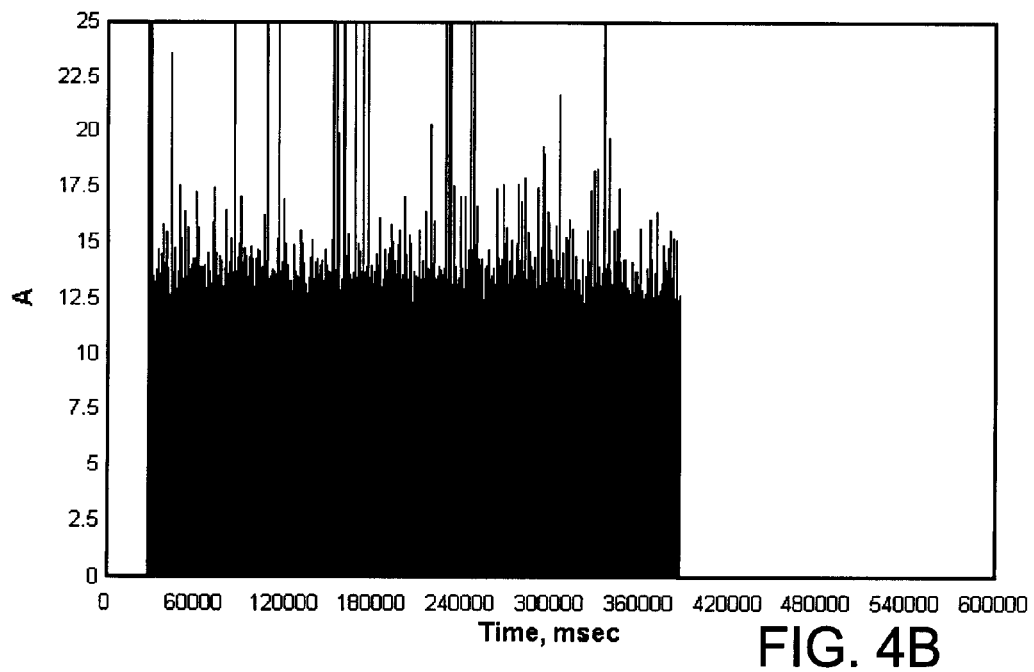

FIGS. 4A and 4B illustrate exemplary charging voltage and charging current behaviors, respectively, for a 1 Ah lithium-iron-phosphate battery subjected to 5-minute charge at 4.2V CV/12A CC using a charger of the type shown in FIG. 1. As shown in FIG. 4B, upon commencement of the charging operation, a constant current of approximately 12A is applied to the battery. At a charging current of 12A, a 1 Ah battery would become fully charged (if it were substantially entirely depleted) in approximately 5 minutes (1 Ah/12A=0.0833 h=5 minutes.)

As explained, the charger 10 is configured to cause a substantially constant current to be produced and applied to the battery 12, and therefore, in response to fluctuations in the current (as shown by the spikes appearing in the graph) the charger will cause the average charging current to be maintained constant at approximately 12A. When the charging current is first applied, the voltage at the charging terminals of the charger and/or the battery 12 is approximately 3.7V. The voltage begins to increase and reaches an average level of 4.2V about 3 minutes later (as shown in FIG. 4A). Thereafter, the voltage at the charging terminals is maintained at the level.

Other Embodiments

A number of embodiments of the invention have been described. Nevertheless, it will be understood that various modifications may be made without departing from the spirit and scope of the invention. For instance, the charger can be associated with or embedded within a docking station used with an electronic device, e.g., cell phone, computer, personal digital assistant and so forth. Accordingly, other embodiments are within the scope of the following claims.

What is claimed is:

1. A charger device to charge one or more rechargeable batteries, the device comprising:
   a housing defining a volume of less that about 10 cubic inches, the volume containing:
      a power conversion module to provide output power of between 3-300 Watts; and
      a controller configured to:
         determine a current level to direct to the one or more rechargeable batteries, and
         cause the output power to be directed to the one or more rechargeable batteries at a charging current substantially equal to the determined current level; and
   with the charger device having a ratio of output power of the charger device directed to the one or more rechargeable batteries to volume of the charger device equal to at least 10 Watts/in$^3$.

2. The device of claim 1 wherein the charger device is free of one or more of: a power factor corrector module, an output capacitor and a second stage DC-DC voltage converter module.

3. The device of claim 1 wherein the controller is configured to determine the current level to direct to the one or more rechargeable batteries such that the one or more batteries achieve a pre-determined charge within a charging period of time of 15 minutes or less.

4. The device of claim 3 wherein the pre-determined charge of the one or more batteries is at least 80% of the charge capacity of the one or more rechargeable batteries, and wherein the charging period of time is approximately between 3-15 minutes.

5. The device of claim 4 wherein the pre-determined charge of the one or more rechargeable batteries is approximately 80% of the charge capacity of the one or more batteries, and wherein the charging period of time is approximately between 3-4 minutes.

6. The device of claim 3 wherein the pre-determined charge of the one or more rechargeable batteries is at least 90%-95% of the charge capacity of the one or more batteries, and wherein the charging period of time is approximately 5 minutes.

7. The device of claim 1 wherein the controller is further configured to:
   cause the charging current to be terminated after a period of charging time substantially equal to a particular period of time has elapsed.

8. The device of claim 1 wherein the power conversion module comprises a voltage transformer.

9. The device of claim 8 wherein the device further comprises a feedback control mechanism to cause the controller to regulate current outputted by the power conversion module.

10. The device of claim 9 wherein the feedback control mechanism is configured to regulate the operation of the voltage transformer.

11. The device of claim 9 wherein the feedback control mechanism is configured to maintain the voltage at respective terminals of the one or more rechargeable batteries at a pre-determined upper limit voltage after the voltage at the one or more rechargeable batteries reach the pre-determined upper-limit voltage level.

12. The device of claim 1 wherein the controller configured to determine the current level is configured to determine the current level to direct to one or more lithium-iron-phosphate-based rechargeable batteries.

13. The device of claim 1 wherein the controller configured to cause the output power to be directed to the one or more rechargeable batteries is configured to cause the output power to be directed to the one or more rechargeable batteries without monitoring temperatures of the one or more rechargeable batteries.

14. A method for charging one or more rechargeable batteries, the method comprising:
   determining a current level to direct to the one or more rechargeable batteries; and
   directing output power of between 3-300 Watts to the one or more batteries at a charging current substantially equal to the determined current level, the output power being provided by a charger device having a housing defining a volume of less that about 10 cubic inches, with the charger device having a ratio of the output power of the charger device to volume of the charger device equal to at least 10 Watts/in$^3$.

15. The method of claim 14 wherein the charger device is free of one or more of: a power factor corrector module, an output capacitor and a second stage DC-DC voltage converter module.

16. The method of claim 14 further comprising:
   terminating the charging current after a period of charging time substantially equal to a particular period of time has elapsed.

17. The method of claim 14 wherein determining the current level comprises determining the current level such that the one or more batteries achieve a pre-determined charge within a charging period of time of 15 minutes or less.

18. The method of claim 17 wherein the pre-determined charge of the one or more rechargeable batteries is at least 90% of the charge capacity of the one or more rechargeable batteries, and wherein the charging period of time is approximately 5 minutes.

19. The method of claim 14 further comprising:
   periodically adjusting the charging current after a pre-determined voltage level at respective terminals of the one or more rechargeable batteries is reached to maintain the voltages at the respective terminals of the one or more rechargeable batteries at the pre-determined voltage level.

20. The method of claim 19 further comprising:
   causing an output indicator device to be activated when the pre-determined voltage level at the respective terminals of the one or more rechargeable batteries is reached.

21. The method of claim 14 wherein directing the output power is performed without monitoring temperatures of the one or more rechargeable batteries.

22. The method of claim 14 wherein directing the output power comprises regulating current provided by a power conversion module having a voltage transformer section.

23. The method of claim 22 wherein regulating the current provided by the power conversion module includes regulating the operation of the voltage transformer section.

24. The method of claim 14 wherein determining the current level to direct to the one or more rechargeable batteries comprises determining the current level to direct to one or more rechargeable lithium-iron-phosphate-based batteries.

25. A charger device to charge one or more rechargeable batteries, the device comprising:
a housing defining a volume of less that about 10 cubic inches, the volume containing:
a power conversion module to provide output power of between 3-300 Watts; and
a controller configured to:
determine a current level to direct to the one or, more rechargeable batteries, and
cause the output power to be directed to the one or more rechargeable batteries at a charging current substantially equal to the determined current level to charge the rechargeable batteries to substantially full charge from an initial low charge level within a charging period of time of 15 minutes or less;
the controller configured to not monitor temperatures of the one or more rechargeable batteries; and
with the charger device having a ratio of output power of the charger device directed to the one or more rechargeable batteries to volume of the charger device equal to at least 10 Watts/in$^3$.

26. The device of claim 25 wherein the substantially full charge of the one or more batteries is at least 80% of the charge capacity of the one or more rechargeable batteries, and wherein the charging period of time is approximately between 3-15 minutes, and the controller is further configured to:
cause the charging current to be substantially terminated after a period of charging time of less than 15 minutes has lapsed.

27. The device of claim 25 wherein the substantially full charge of the one or more rechargeable batteries is approximately 80% of the charge capacity of the one or more batteries, and wherein the charging period of time is approximately between 3-4 minutes, and the controller is further configured to:
cause the charging current to be substantially terminated after a period of charging time of less than 4 minutes has lapsed.

28. The device of claim 25 wherein the pre-determined charge of the one or more rechargeable batteries is at least 90% to 95% of the charge capacity of the one or more batteries, and wherein the charging period of time is approximately 5 minutes, and the controller is further configured to:
cause the charging current to be substantially terminated after a period of charging time of less than 5 minutes has elapsed.

29. The device of claim 25 wherein the power conversion module comprises a voltage transformer;
a feedback control mechanism to cause the controller to regulate current outputted by the power conversion module, with the feedback control mechanism configured to regulate the operation of the voltage transformer to maintain the voltage at respective terminals of the one or more rechargeable batteries at a pre-determined upper limit voltage after the voltage at the one or more rechargeable batteries reach the pre-determined upper-limit voltage level; and
the charger device excluding: a power factor corrector module, an output capacitor and a second stage DC-DC voltage converter module and a heat sink.

30. The device of claim 25 wherein the controller configured to determine the current level is configured to determine the current level to direct to one or more lithium-iron-phosphate-based rechargeable batteries.

* * * * *

UNITED STATES PATENT AND TRADEMARK OFFICE
CERTIFICATE OF CORRECTION

| | |
|---|---|
| PATENT NO. | : 8,018,204 B2 |
| APPLICATION NO. | : 11/851013 |
| DATED | : September 13, 2011 |
| INVENTOR(S) | : Jordan T. Bourilkov and David N. Klein |

Page 1 of 1

It is certified that error appears in the above-identified patent and that said Letters Patent is hereby corrected as shown below:

First Page, Col. 2, (Other Publications), Delete "102739242.htm," and insert -- 1002739242.htm, --, therefor.

Column 14, line 14, In Claim 14, after "of" delete "the".

Column 15, line 8, In Claim 25, delete "or," and insert -- or --, therefor.

Signed and Sealed this
Eighth Day of November, 2011

David J. Kappos
*Director of the United States Patent and Trademark Office*